United States Patent [19]

Kokuryu et al.

[11] Patent Number: 4,998,565
[45] Date of Patent: Mar. 12, 1991

[54] REINFORCED HOSE

[75] Inventors: Yuji Kokuryu; Hiroshi Yamaguchi, both of Aichi, Japan

[73] Assignee: Toyoda Gosei Co., Ltd., Nishikasugai, Japan

[21] Appl. No.: 322,570

[22] Filed: Mar. 13, 1989

[30] Foreign Application Priority Data

Mar. 15, 1988 [JP] Japan ............................ 62-33945[U]
Nov. 10, 1988 [JP] Japan .......................... 63-146760[U]

[51] Int. Cl.$^5$ ................................................ F16L 9/14
[52] U.S. Cl. .................................... 138/126; 138/125; 138/137; 138/DIG. 7
[58] Field of Search ............... 138/124, 125, 126, 137, 138/DIG. 7

[56] References Cited

U.S. PATENT DOCUMENTS

| | | | |
|---|---|---|---|
| 3,500,867 | 3/1970 | Elson | 138/125 |
| 4,380,252 | 4/1983 | Gray et al. | 138/125 |
| 4,617,213 | 10/1986 | Asano et al. | 138/126 |
| 4,657,285 | 4/1987 | Akiyama et al. | 138/137 |

Primary Examiner—James E. Bryant, III
Attorney, Agent, or Firm—Cushman, Darby & Cushman

[57] ABSTRACT

A reinforced hose including an inner pipe layer, an intermediate reinforcing layer and an outer pipe layer, each of the inner and outer pipe layers being made of synthetic rubber having a polarity at least at the surface thereof which contacts the intermediate reinforcing layer. The intermediate reinforcing layer is coated with nitrile rubber or a blended material of nitrile rubber and a high-molecular material.

7 Claims, 1 Drawing Sheet

REINFORCED HOSE

BACKGROUND OF THE INVENTION

The present invention relates to a reinforced hose, and more particularly to an improvement in an intermediate reinforcing layer in a reinforced hose.

FIG. 4 shows an example of a conventional reinforced hose 1 to be used as a hose for power steering. The reinforced hose 1 is constituted by an inner pipe layer 3 and an outer pipe layer 7, both of which are made of synthetic rubber having a polar group, and an intermediate reinforcing layer 5. Nitrile rubber (hereinafter referred to as "NBR") is employed as the synthetic rubber having a polar group for forming the inner pipe layer 3, and chloroprene rubber (hereinafter referred to as "CR") is employed as that for forming the outer pipe layer 7. The intermediate reinforcing layer 5 is formed by doubly braiding reinforcing fibers which are composed of polyamide and coated with CR.

The reinforcing fibers are coated with CR in order to prevent the reinforcing fibers from being shifted from one another and in order to improve the adhesiveness of the intermediate reinforcing layer to the inner and outer pipe layers 3 and 7 by use of the polarity of CR, and so on. Particularly, CR is more frequently used as a coating material because high adhesiveness is obtained between the outer pipe layer 7 made of CR and the intermediate reinforcing layer 5.

The reinforced hose 1 having such a configuration as described above has sufficient endurance for present purposes.

However, reinforced hoses are now required to be improved in endurance as one of the car parts for which the current trend is towards being maintenance free.

SUMMARY OF THE INVENTION

It is therefore an object of the present invention to improve the endurance of an intermediate reinforcing layer of a reinforced hose to thereby improve the endurance of the reinforced hose as a whole.

The above object can be achieved by the reinforced hose according to this invention, which comprises: an inner pipe layer, an intermediate layer, and an outer pipe layer, each of the inner and outer pipe layers being made of synthetic rubber having a polarity at least at its surface which is contacted with the intermediate reinforcing layer, and reinforcing fibers forming the intermediate reinforcing layer being coated with nitrile rubber (NBR) or a blended material of nitrile rubber (NBR) and another high-molecular material.

Preferably, an adhesive layer is interposed between the intermediate reinforcing layer and at least one of the inner and outer pipe layers so as to improve the adhesiveness between the layers.

BRIEF DESCRIPTION OF THE DRAWINGS

Other features and advantages of the present invention will be apparent from the following detailed description when considered with the accompanying drawings, wherein.

DETAILED DESCRIPTION OF THE PREFERRED EMBODIMENTS

The preferred embodiments of this invention will be described in detail hereinafter with reference to the accompanying drawings.

Figure 2:
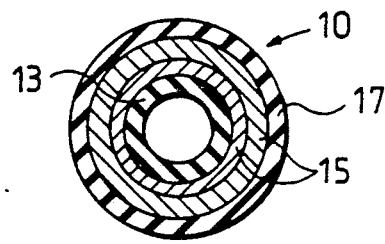
FIG. 2 is a cross-sectional view of an embodiment of the reinforced hose according to the present invention.

Referring to FIG. 2, the reinforced hose 10 according to a first embodiment of the present invention has a basic configuration in which an inner pipe layer 13, an intermediate reinforcing layer 15, and an outer pipe layer 17 are laminated in that order.

As a material for forming the inner pipe layer 13, synthetic rubber having a polar group, such as NBR, chlorosulfonic polyethylene (hereinafter referred to as "CSM"), CR, or the like may be used.

The inner pipe layer 13 may be formed so as to have a multilayer structure. In this case, it will do that at least a surface of the inner pipe layer 13 in contact with the intermediate reinforcing layer 15 is formed of such synthetic rubber having a polar group. The quality of material for the other portions (that is, the surface forming an inner circumferential surface of the reinforced hose, and so on) of the inner pipe layer 13 is not particularly limited.

The intermediate reinforcing layer 15 is formed of reinforcing fibers coated with NBR or a blend material of NBR and another high-molecular material. Here, the term "NBR" includes not only NBR, but also hydrogenated NBR NBR including acrylonitrile of 25 to 30 wt % is preferably used. Examples of the high-molecular material to be blended with NBR include a rubber material such as natural rubber (NR), styrene-butadiene rubber (SBR), acrylic rubber (ANM), butyl rubber (isobutylene-isoprene rubber, IIR), ethylene-propylene rubber (EPDM) and so on; and a resin material such as polyurethane, and so on.

The coating is performed in such a manner that a high-molecular material in a state of latex is applied onto a surface of reinforcing fibers, and then dried and baked. To coat a surface of reinforcing fibers with the high-molecular material in the state of latex, a spray coating method or the like may be used while a dipping process is generally used.

The amount of the high-molecular material adhering to the reinforcing fibers through the coating is preferably selected to be 2 to 10 wt %, more preferably 4 to 8 wt % of the reinforcing fibers As the reinforcing fibers, synthetic fibers such as polyamide, polyester, vinylon, or the like, natural fibers such as cotton or the like, or metal fibers or the like may be used.

Such reinforcing fibers are braided, wound spirally, or knitted so that a tube comprising one layer or more is formed on the upper circumferential surface of the inner pipe layer 13 to thereby form the intermediate reinforcing layer 15.

As a material for forming the outer pipe layer 17, synthetic rubber having a polar group, such as CR, CSM, NBR, or the like may be used The outer pipe layer 17 may be formed so as to have a multilayer structure. In this case, it will do that at least a surface of the outer pipe layer 17 in contact with the intermediate reinforcing layer 15 is formed of such synthetic rubber having a polar group as described above. The quality of material for the other portions (that is, the surface forming an outer circumferential surface of the reinforced hose, and so on) of the outer pipe layer 17 is not particularly limited.

Adhesive layers may be interposed to improve the adhesiveness between the layers. In a reinforced hose 20 illustrated as another embodiment in FIG. 3, adhesive layers 19 are formed between an inner pipe layer 13 and an intermediate reinforcing layer 15 and between the intermediate reinforcing layer 15 and an outer pipe layer 17, respectively. The particular material of the adhesive layers 19 is not particularly limited so long as the material can allow a rubber to adhere to another rubber. An adhesive of chloroprene groups, nitrile rubber groups, polyurethane groups or the like may be used for the adhesive layers 19.

Figure 3:
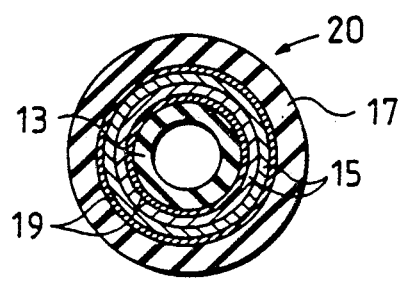
FIG. 3 is a cross-sectional view of another embodiment of the reinforced hose according to the present invention, in which adhesive layers are provided.
Figure 4:
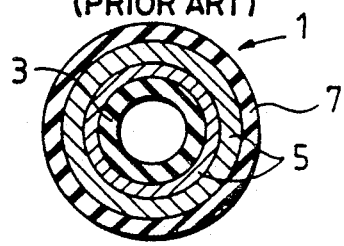
FIG. 4 is a cross-sectional view of an example of the conventional reinforced hose.

In the embodiment as shown in FIG. 3, one of the adhesive layers 19 may be omitted.

The method of manufacturing the reinforced hose 10 will be described hereinafter.

First, the foregoing reinforcing fibers are coated with NBR or the like to prepare the coated reinforcing fibers in a reinforcing-layer forming apparatus (a braiding machine, a spiral machine, or the like). A mandrel is covered at its outer circumference with the foregoing material by means of an ordinary rubber-extruding machine so as to form an inner pipe layer which is not vulcanized. The reinforcing fibers are driven into the outer circumferential surface of the inner pipe layer so as to form an intermediate reinforcing layer.

Then, the outer circumference of the intermediate reinforcing layer 15 is covered with the foregoing material by means of the ordinary rubber-extruding machine so as to form an outer pipe layer which is not vulcanized. The outer pipe layer is vulcanized so that the inner pipe layer 13, the intermediate reinforcing layer 15, and the outer pipe layer 17 are made to adhere to each other through vulcanization, and thereafter the mandrel is drawn out to obtain a reinforced hose as a product.

In order to form the adhesive layers 19, after the inner pipe layer 13 and/or the intermediate reinforcing layer 15 have been formed, the adhesive is applied onto the circumferential surface of the inner pipe layer 13 and/or the intermediate reinforcing layer 15 by using an ordinary coating machine and then the adhesive-applied layers are further dried.

As described above, the reinforced hose according to the present invention comprises an inner pipe layer, an intermediate layers, and an outer pipe layer, each of the inner and outer pipe layers being made of synthetic rubber having a polarity at least at its surface contacting the intermediate reinforcing layer, and the intermediate reinforcing layer being formed of reinforcing fibers which are coated with nitrile rubber or a blended material of nitrile rubber and another high-molecular material.

In the reinforcing fibers thus coated with NBR or the like, as compared to the conventional one, the reinforcing fibers is prevented to a greater extent from being shifted relative to one another and high adhesiveness can be obtained between the intermediate layer and each of the inner and outer pipe layers by the polar group (a group of nitrile in acrylonitrile) of NBR.

By interposing adhesive layers between the intermediate reinforcing layer and each of the inner and outer pipe layers, the adhesiveness between the layers can be further improved.

As is apparent form the following comparative experiment, the intermediate reinforcing layer according to the present invention is improved in endurance in comparison with the conventional one made of reinforcing fibers coated with CR. Accordingly, the reinforced hose according to the present invention is superior in endurance.

EXAMPLES

The examples of the test carried out in order to confirm the foregoing effects will be described hereunder.

Each sample used as reinforcing fiber was formed by twisting two fibers each of which had a thickness of 1260 denier (D), and coated through dipping-treatment under the following conditions.

Material of reinforcing fiber:

66 nylon

Rubber latex:

NBR latex (example of the invention)
CR latex (comparative example)

Heating condition:

drying (130° C.×90 seconds)
baking (230° C.×60 seconds)

After being left to be cooled, the samples were fixed at one end and a gradually increasing tensile load was applied onto their other ends so that a load meter was read when the reinforcing fibers were broken. The read values are shown as thread strength in FIG. 1 (the values corresponding to the point of "initiation" on the abscissa).

Figure 1:
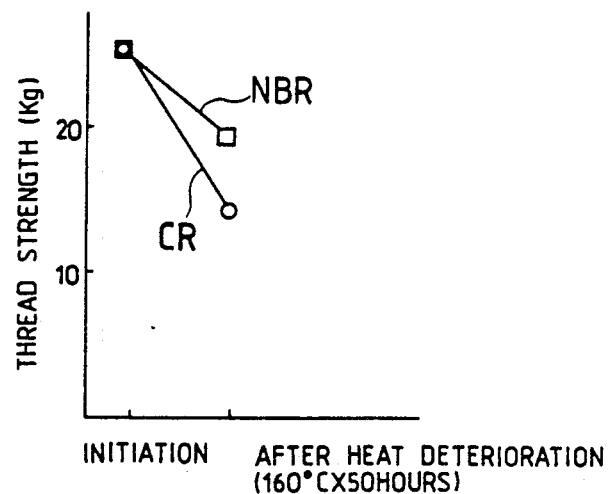
FIG. 1 is a graph showing the endurance of the reinforcing fibers.

In FIG. 1, the symbol □ designates the reinforcing fibers dipping-treated with NBR, and the symbol O designates the reinforcing fibers dipping-treated with CR.

After the respective dipping-treated reinforcing fibers were subject to thermal hysteresis (160° C.×50 hours), the above tensile test was performed and the load meter at that time was read as thread strength. The read values are shown in FIG. 1 (the values corresponding to the point of "after heat deterioration" on the transverse axis).

From FIG. 1, it can be found that the reinforcing fibers dipping-treated with NBR were improved in endurance in comparison with the reinforcing fibers dipping-treated with CR.

In consideration of the above description, examples of the reinforced hose were provided as shown in Table 1 in which materials of the layers of the examples are shown.

TABLE 1

|  | Example of Invention ||||| Comparative Example |
| --- | --- | --- | --- | --- | --- | --- |
|  | 1 | 2 | 3 | 4 | 5 |  |
| Outer pipe layer | CSM | CSM | CR | CSM | CSM | CR |
| Adhesive layer | No | CHEMLOK 402 | CHEMLOK 402 | CHEMLOK 402 | No | CR |

TABLE 1-continued

| | Example of Invention | | | | | Comparative Example |
|---|---|---|---|---|---|---|
| | 1 | 2 | 3 | 4 | 5 | |
| Intermediate reinforcing layer | 66 Nylon (NBR-threads) | 66 Nylon (NBR-threads) | 66 Nylon (NBR-threads) | 66 Nylon (NBR-threads) | 66 Nylon (NBR-threads) | 66 Nylon (CR-dipped thread) |
| Adhesive layer | No | CHEMLOK 402 | CHEMLOK 402 | CHEMLOK 402 | CHEMLOK 402 | CHEMLOK 402 |
| Inner pipe layer | Hydro-generated NBR | Hydro-generated NBR | Hydro-generated NBR | Hydro-generated NBR | Hydro-generated NBR | Hydro-generated NBR |

In Table 1, the respective values of thickness of the inner pipe layer, the outer pipe layer, and the adhesive layer was 1.6 mm, 1.3 mm and 0.2 mm, respectively. "CHEMLOK 402" is a trade-name of an adhesive (an adhesive of isocyanate base) produced by Lord Incorporation.

The intermediate reinforcing layer was formed through a process in which reinforcing fibers of 66 nylon were dipped in the NBR latex under the same conditions as those described above and braided on the circumferential surface of the inner pipe layer with a pitch of 35 mm.

The reinforced hoses thus arranged are improved in endurance of the intermediate reinforcing layer and therefore improved in endurance as a whole in comparison with the conventional reinforced hoses.

Further, the adhesiveness between the inner, intermediate, and outer pipe layers is improved by provision of the adhesive layers.

When the reinforced hose of the first example of the invention (a type having no adhesive layer) was cut in round slices with a width of 25 mm, the load required to peel the outer pipe layer from the intermediate layer was 6 kg, while in the case of the reinforced hose of the second example of the invention (a type having adhesive layers), the load of 8 kg was required to peel the outer pipe layer similarly to the first example of the invention. In the case of the reinforced hose of the comparative example, the load of 8 kg was required to peel the outer pipe layer.

What is claimed is:

1. A reinforced hose, comprising:
   an inner pipe layer;
   an intermediate reinforcing layer; and
   an outer pipe layer,
wherein each of said inner and outer pipe layers is made of synthetic rubber having a polarity at least at the surface thereof in contact with said intermediate reinforcing layer, and wherein said intermediate reinforcing layer comprises reinforcing fibers individually coated with one of nitrile rubber and a blended material of nitrile rubber and a high-molecular material to provide a means to prevent the fibers from being shifted from one another and to improve the adhesiveness of the intermediate reinforcing layer to the inner and outer pipe layers.

2. A reinforced hose as claimed in claim 1, said reinforced hose further comprising an adhesive layer interposed between said intermediate reinforced layer and at least one of said inner and outer pipe layers.

3. A reinforced hose as claimed in claim 2, wherein said adhesive layer comprises a material selected from the group consisting of chloroprene rubber base, nitrile rubber base and polyurethane base.

4. A reinforced hose as claimed in claim 1, wherein said inner and outer pipe layers comprise a synthetic rubber selected from the group consisting of nitrile rubber, chlorosulfonic polyethylene and chloroprene rubber.

5. A reinforced hose as claimed in claim 1, wherein said reinforcing fibers comprise a material selected from the group consisting of polyamide, polyester, vinylon, cotton, and metal fibers.

6. A reinforced hose as claimed in claim 1, wherein said high-molecular material comprises a material selected from the group consisting of natural rubber, styrene-butadiene rubber, acrylic rubber, isobutylene-isoprene rubber, ethylene-propylene rubber and polyurethane.

7. A reinforced hose as claimed in claim 6, wherein the amount of said high-molecular material to be coated to said reinforcing fibers is 2 to 10 wt % of said reinforcing fibers.

* * * * *